United States Patent
Cegalin et al.

(10) Patent No.: US 12,038,105 B2
(45) Date of Patent: *Jul. 16, 2024

(54) FLAT FLEXIBLE HOSE FOR TRANSPORTING FLUIDS

(71) Applicant: FITT S.p.A., Sandrigo (IT)

(72) Inventors: Alessandro Cegalin, Vicenza (IT); Luca Battaglia, Bassano del Grappa (IT); Gianfranco Battaglin, Sandrigo (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,142

(22) Filed: Jul. 23, 2023

(65) Prior Publication Data

US 2023/0366491 A1    Nov. 16, 2023

Related U.S. Application Data (63) Continuation of application No. 17/629,317, filed as application No. PCT/IB2020/061026 on Nov. 23, 2020, now Pat. No. 11,774,010.

(30) Foreign Application Priority Data

Nov. 22, 2019  (IT) .......................... 102019000021978

(51) Int. Cl.
| | |
|---|---|
| *F16L 11/08* | (2006.01) |
| *B29C 51/12* | (2006.01) |
| *B29C 51/42* | (2006.01) |
| *F16L 11/12* | (2006.01) |
| *B29L 7/00* | (2006.01) |
| *B29L 23/00* | (2006.01) |

(52) U.S. Cl.
CPC ............ *F16L 11/085* (2013.01); *B29C 51/12* (2013.01); *B29C 51/42* (2013.01); *F16L 11/121* (2013.01); *B29L 2007/007* (2013.01); *B29L 2023/005* (2013.01)

(58) Field of Classification Search
CPC .......... F16L 11/12; F16L 11/08; F16L 11/081; F16L 11/085; F16L 11/02
USPC ................................ 138/118, 119, 123–126
See application file for complete search history.

(56) References Cited

U.S. PATENT DOCUMENTS

| | | | | |
|---|---|---|---|---|
| 3,581,778 A | * | 6/1971 | Korejwa | F16L 11/085 138/119 |
| 4,467,837 A | * | 8/1984 | Baker | B29C 66/729 138/119 |

(Continued)

*Primary Examiner* — Patrick F Brinson
(74) *Attorney, Agent, or Firm* — Themis Law (57) ABSTRACT

A flat flexible hose for transporting a fluid, for example water, is adapted to move between an inoperative position having a flattened configuration and an operative position, in which the hose expands radially under pressure from the fluid. The hose has a first inner layer defining an axis, a second covering layer, and a reinforcement textile layer therebetween. The first and second layers are made of a first and respectively a second thermoplastic elastomeric material adapted to adhere to each other. The reinforcement textile layer is made of rigid textile yarns which at least partially have a respective first and second predetermined inclination opposite to each other so that the length of the hose remains unchanged both in the inoperative and the operative positions. The reinforcement textile layer is a knitted layer with tricot chain stitches with rows of stitches and courses of stitches made of chain stitches.

11 Claims, 4 Drawing Sheets

(56) References Cited

U.S. PATENT DOCUMENTS

| | | | | |
|---|---|---|---|---|
| 4,478,661 A * | 10/1984 | Lewis | ................ | B29C 66/4322 |
| | | | | 138/119 |
| 5,477,888 A * | 12/1995 | Mezzalira | ............. | F16L 11/085 |
| | | | | 138/125 |
| 6,199,594 B1 * | 3/2001 | Mezzalira | ............. | F16L 11/085 |
| | | | | 138/125 |
| 10,359,130 B2 * | 7/2019 | Mezzalira | ................ | B32B 5/06 |
| 2011/0209791 A1 * | 9/2011 | Mezzalira | ................ | D04B 9/44 |
| | | | | 66/190 |
| 2013/0092276 A1 * | 4/2013 | Caneva | ................... | F16L 11/02 |
| | | | | 138/123 |
| 2015/0152984 A1 * | 6/2015 | Disbrow | ................ | F16L 11/12 |
| | | | | 138/119 |
| 2019/0145553 A1 * | 5/2019 | Mezzalira | ............... | F16L 11/12 |
| | | | | 138/118 |

\* cited by examiner

FLAT FLEXIBLE HOSE FOR TRANSPORTING FLUIDS

FIELD OF THE INVENTION

The present invention relates to the technical field of flexible hoses, for example irrigation hoses, and in particular it relates to a flat flexible hose for transporting fluids, as well as a method for manufacturing it.

Definitions

In the present document, the expression "textile yarn" or its derivatives is used to indicate an elongated yarn-like element of any shape and made of any material, as long as the dimension of the length considerably prevails over the others. For example, the textile yarn may be a polymeric yarn, which may have a unitary structure or it may in turn consist of the joining of several elementary yarns, or a textile band of any shape.

In the present text, unless otherwise specified, the expression "rigid textile yarns" or its derivatives is used to indicate textile yarns having an elongation at rapture—measured according to BISFA (Cap 7)—lesser than 10%, and preferably lesser than 7%.

In the present text, the expression "reinforcement textile layer" or its derivatives is used to indicate a layer consisting of at least one textile yarn arranged on the underlying layer. The "reinforcement textile layer" is arranged on the bearing layer so as to leave portions thereof free, generally square, rectangular or rhomboidal-shaped.

In the present document, the expression "cross-hatched textile layer" or "cross-hatching" or its derivatives is used to indicate a layer consisting of at least two yarns or groups of yarns spiral-wound on the bearing layer with opposite inclinations and mutually superimposed but not connected. Thus, a cross-hatching is made up of two or more superimposed spiralings.

In the present text, the expression "spiraled textile layer" or "spiraling" or derivatives is used to indicate a layer consisting of a single yarn spiral-wound on the bearing layer with a predetermined pitch or groups of groups of yarns spiral-wound on the bearing layer not superimposed on each other.

In the present text, the expression "knitted textile layer" or "knitting" or derivatives is used to indicate a layer consisting of at least two yarns or groups of yarns deposited on the bearing layer and connected together to form a plurality of chain stitches, "stitches" of the tricot type. A "knitted textile layer" is obtained using circular knitting machines provided with a plurality of needles, of the per se known type.

In the present text, the expression "chain stitch of the tricot type" and the like is used to indicate the portion of a "knitted textile layer" forming an annular eyelet, not necessarily closed. Each "chain stitch of the tricot type" is concatenated to a corresponding preceding "chain stitch of the tricot type" and to a corresponding subsequent "chain stitch of the tricot type".

In the present document, the expression "row of stitches" and the like of a knitted textile layer with chain stitches of the tricot type is used to indicate the line defined by the "chain stitches of the tricot type" concatenated to each other.

In the present document, the expression "courses of stitches" and the like of a knitted textile layer with chain stitches of the tricot type is used to indicate the portion of textile yarn (or set of yarns grouped into a single yarn) mutually connecting two consecutive "chain stitches of the tricot type" along the same yarn. Such portion may be linear or in turn configured as a "chain stitches of the tricot type".

In the present document, the expression "compatible materials" or its derivatives is used to indicate materials chemically/physically compatible with each other, i.e. materials that, once coupled, form a joint suitable to support the transfer of tractive or shearing forces through the contact surfaces. Thus, the maximum compatibility will be observed in identical materials or materials having matrices of the same base.

In the present document, the expression "matrix" of a polymer or its derivatives is used to indicate a polymeric material capable of providing the molecular structure of the finished product.

In the present document, the expression "providing" or its derivatives is used to indicate the preparation of an element of interest to a process step of interest, thus including any preventive treatment aimed at the optimal execution of the step of interest, from simple collection and possible storage to heat and/or chemical and/or physical pre-treatments and the like.

State of the Art

Flat flexible hoses for transporting fluids, in particular liquids, are known. Such hoses are for example used in agriculture or gardening, and they are generally made of plasticized PVC with a polyester cross-hatching.

A first drawback of such flexible hoses is the presence of brittle points at the folds of the flat hose, due to the presence of the cross-hatching.

Another drawback lies in the change in the response of the hose to the widening and flattening cycles, due to the different mechanical behavior of the polymeric material and of the cross-hatching.

Thus, such hoses have a limited duration over time.

Another drawback of such flexible hoses lies in the high environmental impact thereof, both in terms of materials used for the production and in terms of disposal of the finished product.

SUMMARY OF THE INVENTION

An object of the present invention is to overcome the drawbacks illustrated above by providing a flat hose having excellent mechanical characteristics.

A further object of the present invention is to provide a particularly strong flat flexible hose.

Another object of the present invention is to provide a flat flexible hose with a constant response to the widening and flattening cycles.

A further object of the present invention is to provide a flat flexible hose which is particularly resistant to abrasion.

Another object of the present invention is to provide a low environmental impact flat flexible hose.

These and other objects which will be more apparent hereinafter, are achieved by a flat hose made of thermoplastic elastomer, as well as a method for manufacturing it as described and/or claimed herein.

The flat flexible hose may be useful for transporting any fluid. It may comprise:
  at least one first inner layer defining an axis;
  at least one second layer;
  at least one reinforcement textile layer interposed between said at least one first layer and at least one second layer.

Said at least one first and one second layer and said at least one reinforcement textile layer may cooperate mutually so that the flexible hose is susceptible to move between an inoperative position in which it is substantially flat-shaped and an operative position in which it expands radially to take a substantially cylindrical shape, the hose moving from the inoperative position to the operative position under the pressure of the transported fluid and from the operative position to the inoperative position when the pressure of the fluid pressure ceases.

The at least one first and one second layer may be respectively made of a first and a second thermoformable polymeric material, mutually compatible with each other.

The at least one reinforcement textile layer may consist of rigid textile yarns which at least partially have a respective first and second predetermined inclination opposite each other with respect to said axis.

Said at least one reinforcement textile layer may be a knitted layer with chain stitches of the tricot type with rows of stitches and courses of stitches, at least one of said rows of stitches and courses of stitches consisting of said chain stitches.

Advantageously, both said rows of stitches and courses of stitches may consist of said chain stitches of the tricot type.

Suitably, the flexible hose may comprise a single reinforcement textile layer consisting of said knitted layer with chain stitches of the tricot type.

Preferably, the flexible hose may be free of at least one reinforcement textile layer, which is cross-hatched and/or spiraled.

Advantageously, the first and second polymeric material may have elastic behavior both in said inoperative position and in said operative position of the hose.

In a preferred but non-exclusive embodiment, said first and second polymeric material may be selected from the group consisting of: thermoplastic polymeric materials, elastomers, thermoplastic elastomers.

Suitably, said at least one second outer layer may be susceptible to be gripped by a user, said at least one second outer layer having a Shore A hardness measured according to ASTM D 2240 greater than that of said at least one first inner layer.

Advantageously, said at least one second outer layer may have a Shore A hardness measured according to ASTM D 2240 comprised between 70 ShA and 90 ShA, and preferably comprised between 75 ShA and 85 ShA.

Preferably said at least one first inner layer may have a Shore A hardness according to ASTM D 2240 comprised between 60 ShA and 80 ShA, and preferably comprised between 65 ShA and 75 ShA.

In a further aspect, there may be provided for a method for manufacturing a flat flexible hose according to one or more of the preceding claims, comprising—in sequence—the following steps:
providing a tubular semi-finished product including:
at least one first inner layer defining an axis;
at least one second outer layer;
at least one reinforcement textile layer interposed between said at least one first layer and at least one second layer;
wherein said at least one first and one second layer are respectively made of a first and a second thermoformable polymeric material, mutually compatible with each other;
wherein said at least one reinforcement textile layer consists of rigid textile yarns which at least partially have a respective first and second predetermined inclination opposite each other with respect to said axis;
wherein said at least one reinforcement textile layer is a knitted layer with chain stitches of the tricot type with rows of stitches and courses of stitches, at least one of said rows of stitches and courses of stitches consisting of said chain stitches; wherein said tubular semi-finished product is at a first predetermined thermoforming temperature;
crushing said semi-finished product to obtain the flat flexible hose;
first cooling of said flat flexible hose.

The dependent claims describe advantageous embodiments of the invention.

BRIEF DESCRIPTION OF THE DRAWINGS

Further characteristics and advantages of the invention will be more apparent in light of the detailed description of some preferred but non-exclusive embodiments of the invention, illustrated by way of non-limiting example with reference to the attached drawings, wherein.

DETAILED DESCRIPTION OF SOME PREFERRED EMBODIMENTS

With reference to the aforementioned figures, herein described is a flat flexible hose 1 for transporting fluid.

For example, the flexible hose 1 may be a garden hose or irrigation hose for transporting water, in particular potable water.

The hose 1 may move between an inoperative position in which it is substantially flat-shaped and an operative position in which it expands radially, by the pressure imparted by the fluid, to take the conventional tubular cylindrical shape. When the pressure in the hose ceases, for example when the water faucet is shut off, the hose can return to the inoperative position.

Figure 2:
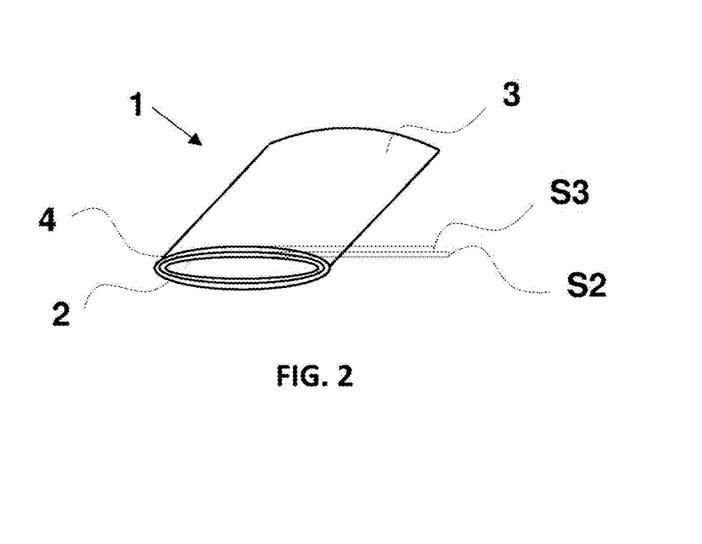
FIG. 2 is a schematic view of a flat flexible hose 1.

Thus, when no fluid circulates in the flexible hose, the flexible hose takes the substantially flat shape, as illustrated in FIG. 2. This ensures the minimum overall dimension of the flexible hose while ensuring the same flow rate as a "conventional" flexible hose.

In a preferred but non-exclusive embodiment, the flexible hose 1 may consist of an inner layer 2, which may be made of thermoplastic elastomer, an outer covering layer 3, which may also be made of thermoplastic elastomer and, interposed between them, one or more reinforcement textile layers 4, which may for example be made of polyester yarn (PET).

It is clear that the reinforcement layer 4 may be arranged on the inner layer 2, so as to leave portions of the latter—for example square, rectangular or rhomboidal-shaped-free.

In this manner, the overlying layer, for example the covering layer 3, may be coupled with the underlying one, mainly by gluing or melting the materials, at such free portions.

Preferably, the thermoplastic elastomers of the layers 2 and 3 may therefore be compatible materials.

Suitably, the inner layer 2 may define an axis X, i.e. the axis of the hose 1.

Such layer 2 may be designated to come into contact with the liquid to be transferred, while the outer cover layer 3 may be designated to be grasped by a user.

However, further textile or polymeric layers may be provided between the aforementioned layers 2, 3 and 4 or beneath or above them, without departing from the scope of protection of the attached claims.

For example, a further inner layer interposed between the layer 2 and the textile layer 4, for example a film suitable to prevent the formation of algae in the hose, may be provided for.

Furthermore, a further polymeric layer which can be grasped by a user may be fixed on the covering layer 3 without departing from the scope of protection of the attached claims.

The thermoplastic elastomers of layers 2 and 3 may be selected from the group consisting of: EPDM or NBR vulcanized thermoplastic elastomers (TPE-V), thermoplastic silicone polymers (TPSiV), SEBS or SEPS thermoplastic elastomers (TPE-S), thermoplastic OLEFINIC elastomers (TPO), thermoplastic POLYAMIDE elastomers (TPE-A), thermoplastic polyurethane elastomers (TPU), thermoplastic polyester elastomers (TPE-E).

According to a preferred but non-exclusive embodiment, the layers 2 and 3 may be both made of EPDM vulcanized thermoplastic elastomer (TPE-V), for example Santoprene® 201-64 and Santoprene® 201-73, respectively. Suitably, the layers 2 and 3 may be the only polymeric layers of the hose.

Preferably, the inner layer 2 may be made of a material suitable for contact with food or food liquids.

It is clear that the materials of the inner layer 2 and of the covering layer 3 may or may not be the same without departing from the scope of protection of the attached claims.

Suitably, the material of the covering layer 3 may have a Shore A hardness measured according to the ASTM D 2240 standard, comprised in a range between 70 ShA and 90 ShA, and preferably comprised between 75 ShA and 85 ShA, so as to maximize the abrasion resistance of the hose 1 over time, while providing a feeling of softness to the touch.

Furthermore, the material of the inner layer 2 may have a Shore A hardness measured according to the ASTM D 2240 standard, comprised between 60 ShA to 80 ShA, and preferably comprised between 65 ShA and 75 ShA, i.e., lower than the Shore A hardness of the covering layer 3.

In this manner, in particular the layer 2 may be light and at the same time it may be capable of reducing and compensating the tractive force generated by the reinforcement layer 4 during the progressive expansion cycles of the hose 1.

In a further embodiment, the layers 2 and 3 may be made of an elastomeric material or thermoplastic material, for example plasticized PVC.

In any case, the polymeric material of the layers 2 and 3 may have elastic behavior both in the inoperative position and in the operative position of the flexible hose, so as to allow the latter to move automatically between the inoperative and operative positions in response to the action or absence of pressure inside the hose.

Furthermore, the polymeric material of the layers 2 and 3 may be of the thermoformable type, so as to allow the hose to take the flat shape during the production, as better described hereinafter.

In order to prevent the generation of rapture areas due to the less elastic response of the rigid textile yarns of the reinforcement layer 4 mainly with respect to the layer 3 upon the radial expansion of the hose 1 subjected to the pressure of the fluid, the reinforcement layer 4 may be a knitted layer with chain stitches 6 of the tricot type.

Figure 1A:
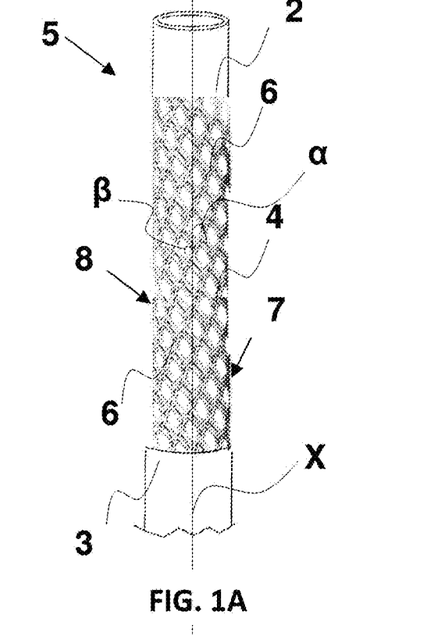
FIG. 1A is a schematic view of a semi-finished product 5 in which both the rows of stitches 8 and the courses of stitches 7 both consist of chain stitches 6.
Figure 1B:
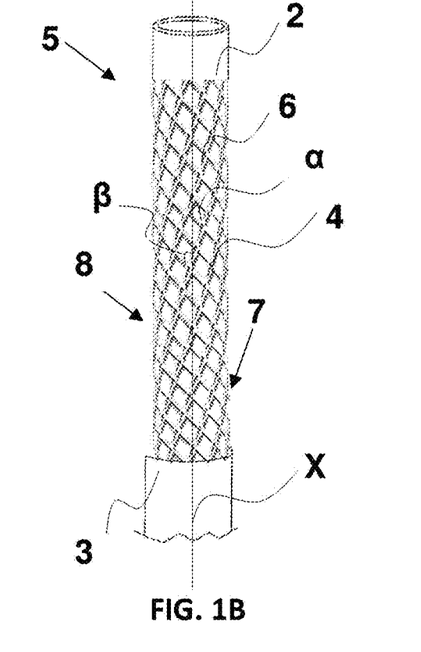
FIG. 1B is a schematic view of a semi-finished product 5 in which the rows of stitches 7 consist of chain stitches 6.

The latter can be obtained, for example, according to the disclosures of patent EP0623776, as illustrated in FIG. 1B.

However, both the rows of stitches 8 and the courses of stitches 7 may consist of chain stitches, as particularly illustrated in FIG. 1A.

In this manner, the reinforcement layer 4 thus configured may expand upon the through-flow of the fluid into the hose 1, preventing the formation of localized traction points typical for example of a cross-hatching and thus distributing the tractive force over the entire knitted layer 4.

Thus, the flexible hose 1 may be without cross-hatched and/or spiraled reinforcement layers.

Furthermore, the flexible hose 1 may include a single reinforcement layer 4, configured for example as described above.

Suitably, such reinforcement layer 4 may consist of rigid textile yarns which have a respective first and second inclination α, β opposite each other with respect to the axis X, so that the length of the hose 1 remains unchanged both in the inoperative position and in the operative position.

In addition, the radial expansion of the hose 1 may be contained in order to prevent the bursting thereof when subjected to the pressure of the fluid.

In particular, in order to avoid excessive deformation of the hose 1 in the operative position, due to the pressure of the fluid, the inclinations α, β may have a value comprised between 42° and 53° with respect to the axis X.

As a matter of fact, such values will allow the reinforcement layer 4 to counter the deformations due to the internal pressure both in the axial direction and in the radial direction.

As a matter of fact, without the reinforcement layer 4 configured as described above, the hose 1, in the operative position, would tend to deform axially and radially due to the elasticity of the materials used.

More in particular, the inclinations α, β described above will enable to obtain a hose 1 capable—under the operating pressure of 2 bars—of increasing the length thereof by 1.1 times at most with respect to the initial length thereof, i.e. the length of the hose with no fluid flowing through it, preferably the by 1.05 times at most with respect to the initial length thereof.

Furthermore, the inclinations α, β described above will enable to obtain a hose 1 capable—under the operating pressure of 2 bars—of increasing the maximum inner diameter thereof by 1.1 times with respect to the initial inner diameter, preferably the maximum of 1.05 times with respect to the initial inner diameter.

In a preferred but non-exclusive embodiment, the inner layer 2 may have a thickness s2 while the covering layer 3 may have a thickness s3 in a ratio comprised between 1.05:1 and 1.5:1, and preferably in a ratio comprised between 1.1:1 and 1.4:1.

For example, the inner layer 2 may have a thickness s2 comprised between 1 mm and 1.1 mm, while the covering layer 3 may have a thickness s3 comprised between 0.8 mm and 0.9 mm.

This will allow to obtain a hose 1 having a total thickness comprised between 1.8 mm and 2 mm, being particularly strong and resistant to bursting.

Figure 6:
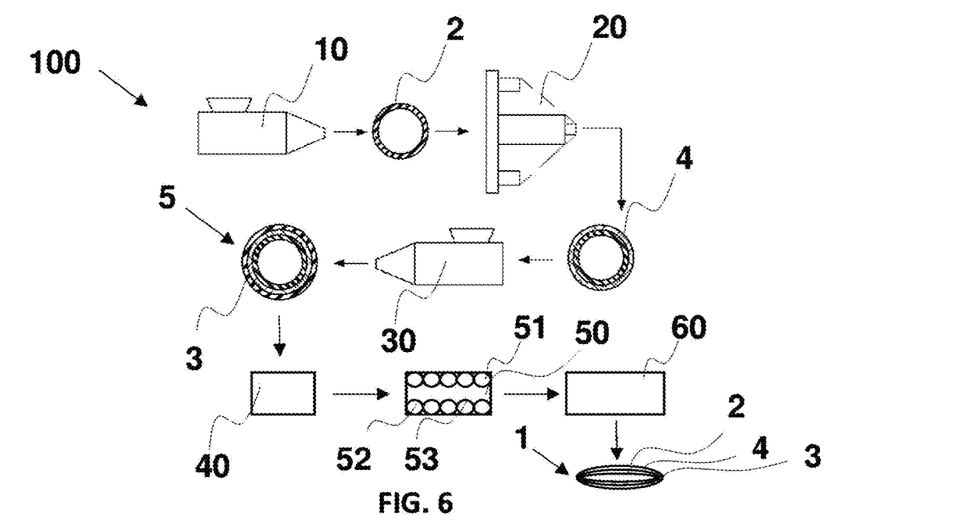
FIG. 6 is a schematic view of a production line of a flat flexible hose 1, highlighting the sections of the article 5 and of the hose 1 obtained progressively.

From a manufacturing point of view, as particularly illustrated in FIG. 6, the hose 1 may be made by means of the production line 100 by extruding the first thermoplastic elastomer in a first extruder 10 to form the inner layer 2, by forming the reinforcement layer 4 above the latter by means of a knitting machine 20 and by extruding the second thermoplastic elastomer above the latter by means of a second extruder 30 to form the covering layer 3.

The tubular semi-finished product 5 will then be cooled for a period of time preferably equal to about 0.5-1.5 s, even more preferably 1 s, by immersion into a relatively short tank 40, for example measuring 20 cm-40 cm, with water at a temperature of 12° C.-20° C., more preferably 15° C.-17° C., for example 16° C. More particularly, the length of the tank 40 may be such that the hose section which is immersed thereinto instant by instant is about 30 cm.

Preferably, the tank 40 may be arranged sequentially to the extruder 30, at a minimum distance from the latter.

In this manner, the semi-finished product 5 will pass from a first extrusion temperature, as well as a thermoforming temperature, equal to about 170° C.-190° C., for example 180° C., to a second operating temperature equal to about 90° C.-110° C., for example 100° C. More in particular, such temperature may be relative to the outer surface of the semi-finished product 5.

Subsequently, the tubular semi-finished product 5 having such second temperature will be crushed into a device 50 for crushing the hose to obtain the flat flexible hose 1.

Suitably, such device 50 may comprise one or more series of rollers 51, 52 facing each other and arranged at a distance such as to minimize the presence of air inside the hose 1. Ideally, the distance between the rollers 51, 52 may be twice the thickness of the wall of the hose 1.

Suitably, at least one outer layer 53 of relatively soft material, for example a coating or a belt made of rubber, preferably natural rubber having a Shore A hardness comprised between 50 and 70, for example 60, may be arranged externally to each roller 51, 52, so as to preserve the structural wholeness of the hose during crushing.

A relatively long tank 60 may be arranged sequentially to the rollers 51, 52, for example at a distance of 1-1.5 m, so that the hose is cooled instantaneously with water at a temperature of 12° C.-20° C., more preferably 15° C.-17° C., for example 16° C., for a period of time equal to 100-120 s.

The length of the tank 60 may be such that the hose section that is immersed thereinto instant by instant is about 30-35 mt.

In this manner, the hose 1 will reach a third temperature substantially equal to the ambient temperature, for example in a range from 12° C.-30° C., more preferably 15° C.-25° C.

In this manner, the line 100 will allow to obtain a flat flexible hose 1 which is particularly resistant and has a constant response to the widening and flattening cycles.

However, it is clear that it will be possible to obtain the flat flexible hose 1 directly starting from a tubular semi-finished product 5 having the aforementioned characteristics, by crushing and cooling it.

The above will be described in greater detail with reference to the following examples which, in any case, shall not be deemed to limit the scope of protection of the invention.

EXAMPLES

Samples:
for each type of test, several tests (3 or 5) were performed for each sample (WX1, WX2, WX3), all obtained by means of the aforementioned method.
Configuration of WX1 Sample Tests:
    inner layer: Plasticized PVC K70 62 ShA;
    cover layer: Plasticized PVC K70 62 ShA;
    textile reinforcement layer: PET-38 knots.
Configuration of WX2 Sample Tests:
    inner layer: Plasticized PVC S100 48 ShA;
    cover layer: Plasticized PVC S100 48 ShA;
    textile reinforcement layer: PET-39 knots.
Configuration of WX3 Sample Tests:
    inner layer: Santoprene® 201-64, 69 ShA;
    cover layer: Santoprene® 201-73, 78 ShA;
    textile reinforcement layer: PET-37 knots.

The plasticized PVC compositions of the samples WX1 and WX2 are of the standard type in the field of flexible hoses, and they may consist of PVC matrix of the aforementioned type, dioctyl terephthalate (DOTP) plasticize at an amount such to obtain the aforementioned hardness, 1% by weight of Ca—Zn stabilizer and 0.5% by weight of epoxidized soybean oil co-stabilizing agent.

Example 1: Burst Under Pressure at Room Temperature (23° C.)

The aforementioned samples were subjected to the pressure burst test, inflating the hose with air at room temperature (23° C.). For each sample, the mean results for three tests are reported in Table 1, showing a good response of the sample WX3, which, although made of thermoplastic elastomer, demonstrates a behavior comparable to the mean of the results obtained with the samples WX1 and WX2 made of PVC, of a more rigid nature in itself.

TABLE 1

| Sample | Burst pressure (bar) |
| --- | --- |
| WX1 | 42.97 |
| WX2 | 32.33 |
| WX3 | 38.5 |

It should be noted that the values reported in this first example may refer to an embodiment of the sample WX3 which includes rows of stitches 8 and courses of stitches 7 both consisting of chain stitches 6.

Example 2: Shrinkage Percentage Level

The aforementioned samples were subjected to the shrinkage percentage level evaluation test.

In particular, the initial length $L_i$ of each sample is evaluated before introduction into a forced air ventilation oven of the M250-VF type marketed by ATS FAAR Industries srl, at 80° C. for 168 hours.

The final length $L_f$ of each sample is then evaluated, upon exit from the oven.

Therefore, for each sample the percentage of longitudinal shrinkage is calculated using the following formula:

$$\text{Shrinkage} = \frac{L_f - L_i}{L_i} * 100(\%)$$

Wherein:

$L_i$ is the length of the sample before introduction into the oven;

$L_f$ is the length of the sample after introduction into the oven.

The mean of the values detected on the three different tests for each sample is then calculated, as shown in Table 3, showing a good mechanical behavior of the WX3 sample, made of polymeric elastomer, with ensuing constant behavior of the sample in the widening and flattening cycles.

TABLE 3

| Sample | Length (mm) | | Shrinkage (%) |
| --- | --- | --- | --- |
| | $L_i$ | $L_f$ | |
| WX1 | 1000 | 953 | 4.7 |
| WX2 | 1000 | 963 | 3.7 |
| WX3 | 1000 | 997 | 0.3 |

Example 3: Abrasion Test

The results relating to the abrasion test carried out on a hose having a length of about 1 m, filled with water at an internal pressure of 3 bars, are also shown.

Such hose was dragged on an outdoor floor at room temperature of 23° C.

In particular, the dragging speed is 2000 m/h, the weight per meter of the water-filled hose is equal to 160 g/m and the covered dragging distance equal to 8000 m after 4 hours and equal to 16000 m after 8 hours.

Figure 3:
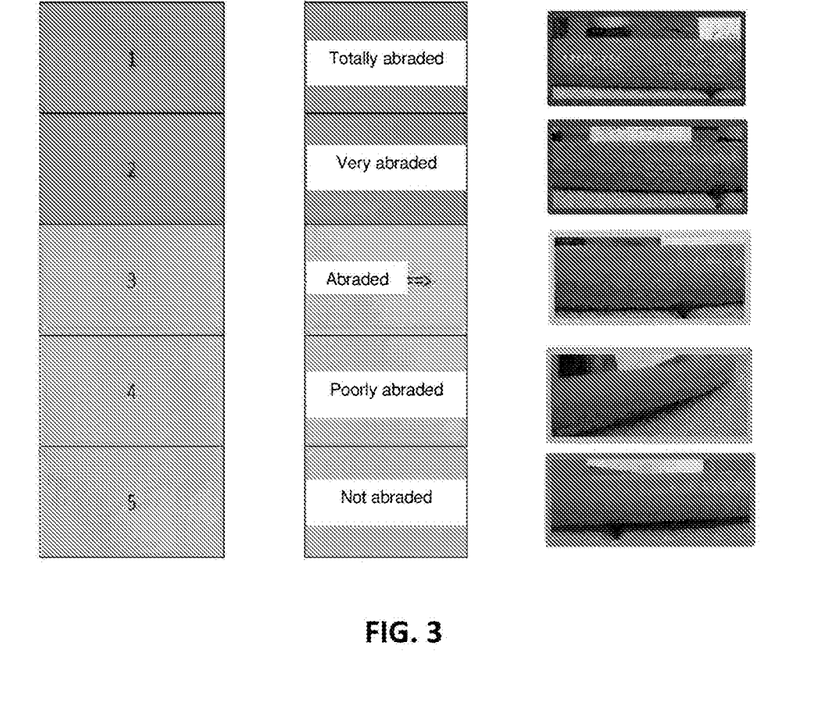
FIG. 3 is a key showing the degrees of abrasion to evaluate the abrasion test on the hose 1.

The sample was then inspected visually by comparing the degree of abrasion with the degrees of abrasion shown in the key of FIG. 3, in which the identified acceptance limit is equal to 4.

Figure 4A:
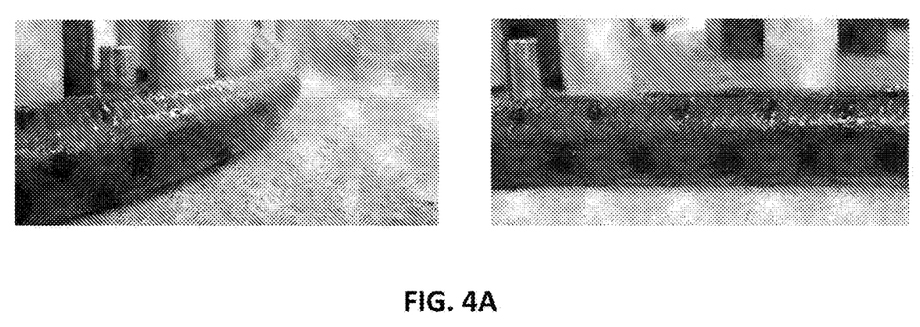
FIGS. 4A and 4B respectively show a sample hose WX2 and a sample hose WX3 subjected to the abrasion test after 4 hours of dragging.
Figure 4B:
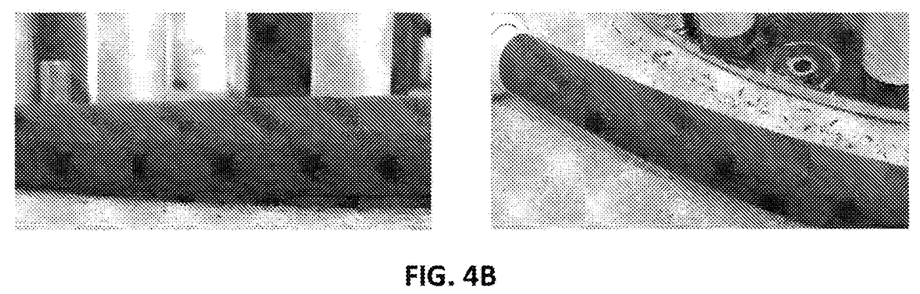
Figure 4C:
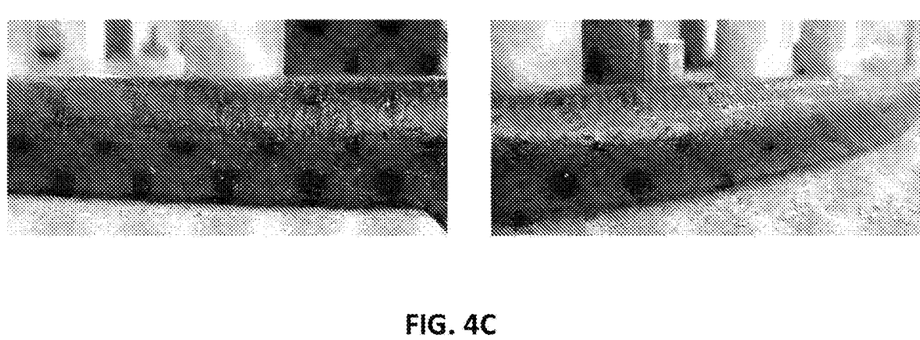
FIGS. 4C and 4D respectively show a sample hose WX2 and a sample hose WX3 subjected to the abrasion test after 8 hours of dragging.
Figure 4D:
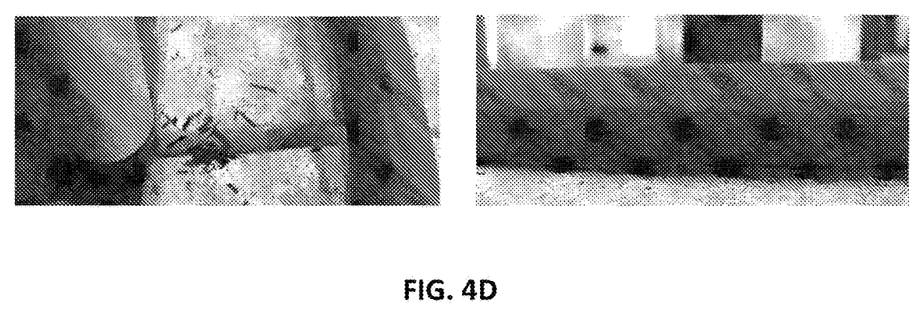

In particular, FIG. 4A and FIG. 4B respectively show a sample hose WX2 and a sample hose WX3 subjected to the abrasion test after 4 hours of dragging, while FIG. 4C and FIG. 4D respectively illustrate the hoses of the sample WX2 and of the sample WX3 subjected to the abrasion test after 8 hours of dragging.

Both results show that the sample WX3 has a degree of abrasion resistance of 5, therefore definable 'non-abraded' according to the key of FIG. 3, equal to the degree of abrasion resistance of the samples WX1 and WX2 made of plasticized PVC.

Example 4: Mechanical Strength (Stress-Strain Curves According to ISO 527)

Figure 5A:
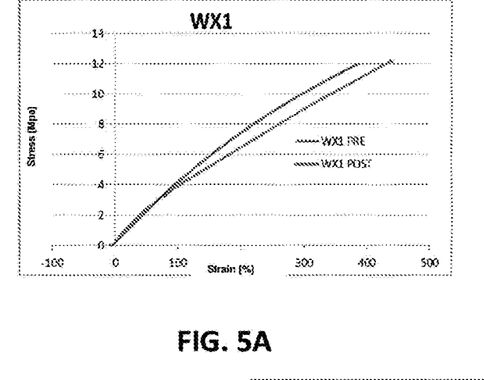
FIGS. 5A, 5B and 5C show the stress-strain curves relating to the mean results detected for each sample WX1, WX2, WX3.
Figure 5B:
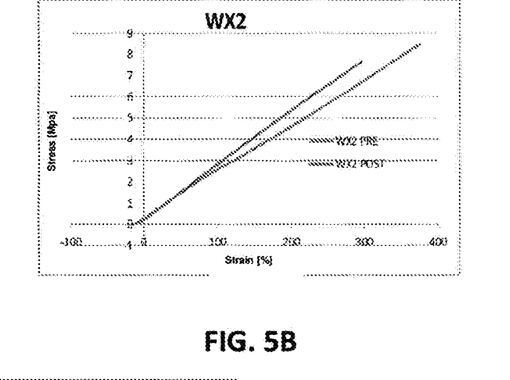
Figure 5C:
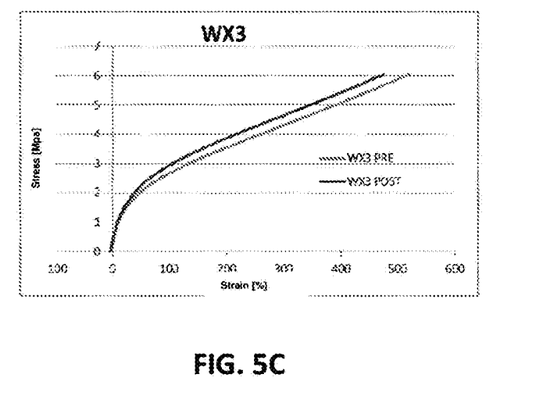

The aforementioned samples were subjected to the mechanical strength test. For each sample WX1, WX2, WX3, FIG. 5A, 5B, 5C show average results for three tests, in the form of stress-strain curves according to the UNI EN ISO 527-1 standard.

From a qualitative comparison it is clear that in the sample WX3 a higher percentage of deformation can be obtained with an imparted force of reduced value, characteristic specific to a thermoplastic elastomer.

Thus, the hose made of thermoplastic elastomer will have a lower tendency to create rupture areas due to the force imparted by the fluid.

The invention claimed is:

1. A flexible hose for transporting a fluid, comprising:
a first inner layer defining a longitudinal axis;
a second layer; and
a reinforcement textile layer interposed between the first layer and the second layer;
wherein the first layer, the second layer, and the reinforcement textile layer cooperate mutually to cause the flexible hose to move between an inoperative position, in which the flexible hose is substantially flat-shaped, and an operative position, in which the flexible hose expands radially to take a substantially tubular shape, the flexible hose moving from the inoperative position to the operative position under a pressure from a transported fluid, and from the operative position to the inoperative position when the pressure of the transported fluid pressure ceases,
wherein the first and the second layer are respectively made of a first and a second thermoformable polymeric material, mutually compatible with each other,
wherein the reinforcement textile layer consists of rigid textile yarns, which are at least partially inclined with respect to the longitudinal axis in opposing directions,
wherein the flexible hose is free of a cross-hatched or spiraled reinforcement textile layer, and
wherein the reinforcement textile layer is a knitted layer with tricot chain stitches with rows of stitches and courses of stitches, at least one of the rows of stitches and at least one of the courses of stitches consisting of the tricot chain stitches.

2. The flexible hose according to claim 1, wherein the rows of stitches and the courses of stitches both consist of the tricot chain stitches.

3. The flexible hose according to claim 1, wherein the flexible hose has a single reinforcement textile layer consisting of the knitted layer with the tricot chain stitches.

4. The flexible hose according to claim 1, wherein the rigid textile yarns of the reinforcement textile layer maintain a radial expansion of the flexible hose in the operative position, substantially preventing a widening thereof starting from the operative position.

5. The flexible hose according to claim 1, wherein the first and the second polymeric material have elastic behaviors both in the inoperative position and in the operative position of the hose.

6. The flexible hose according to claim 1, wherein a length of the flexible hose remains substantially unchanged both in the inoperative position and in the operative position.

7. The flexible hose according to claim 1, wherein the first and the second polymeric materials are selected from the group consisting of: thermoplastic polymeric materials, elastomers, thermoplastic elastomers.

8. The flexible hose according to claim 7, wherein the thermoplastic elastomers and thermoplastic polymeric materials are selected from the group consisting of: EPDM or NBR vulcanized thermoplastic elastomers (TPE-V), thermoplastic silicone polymers (TPSiV), SEBS or SEPS thermoplastic elastomers (TPE-S), thermoplastic OLEFINIC elastomers (TPO), thermoplastic POLYAMIDE elastomers (TPE-A), thermoplastic polyurethane elastomers (TPU), thermoplastic polyester elastomers (TPE-E), and plasticized PVC.

9. A method for manufacturing a flexible hose according to claim 1, comprising, in sequence:

providing a tubular semi-finished product including:
the first layer disposed in an inner position and defining the longitudinal axis;
the second layer disposed in an outer position;
a reinforcement textile layer interposed between the first layer and the second layer,
wherein the first and the second layer are respectively made of the first and the second thermoformable polymeric material, which are mutually compatible with each other,
wherein the reinforcement textile layer consists of the rigid textile yarns which at least partially have the respective first and second predetermined inclination opposite to each other with respect to the longitudinal axis, so that a length of the flexible hose remains substantially unchanged both in the inoperative position and in the operative position,
wherein the reinforcement textile layer is the knitted layer with the tricot chain stitches with the rows of stitches and the courses of stitches, the at least one of the rows of stitches and the at least one of the courses of stitches consisting of the tricot chain stitches, and
wherein the tubular semi-finished product is at a first predetermined thermoforming temperature;
crushing the tubular semi-finished product to obtain the flexible hose as a flat flexible hose; and
first cooling the flat flexible hose by immersing the flat flexible hose into a second tank containing water at a temperature of 12° C. to 20° C. for a period of time equal to 100 to 120 s.

10. The method according to claim 9, wherein the step of crushing is carried out with a device that crushes the tubular semi-finished product and comprises a first and a second sets of rollers.

11. The flexible hose according to claim 1, wherein the rigid textile yarns have a first and second predetermined inclination opposite to each other between 42° to 53° with respect to the longitudinal axis.

* * * * *